July 20, 1965  J. D. EISLER ETAL  3,195,676
CANCELLATION OF SECONDARY SEISMIC REFLECTIONS
Filed April 25, 1960  4 Sheets-Sheet 1

Fig. I

JOSEPH D. EISLER
DANIEL SILVERMAN
INVENTORS.
BY *Newell Potthoff*
ATTORNEY

July 20, 1965    J. D. EISLER ETAL    3,195,676
CANCELLATION OF SECONDARY SEISMIC REFLECTIONS
Filed April 25, 1960    4 Sheets-Sheet 2

JOSEPH D. EISLER·
DANIEL SILVERMAN
INVENTORS.

BY Newell Potter
ATTORNEY

July 20, 1965   J. D. EISLER ETAL   3,195,676
CANCELLATION OF SECONDARY SEISMIC REFLECTIONS
Filed April 25, 1960   4 Sheets-Sheet 3

JOSEPH D. EISLER
DANIEL SILVERMAN
INVENTORS.
BY *Newell Potter*
ATTORNEY

3,195,676
CANCELLATION OF SECONDARY SEISMIC REFLECTIONS
Joseph D. Eisler and Daniel Silverman, Tulsa, Okla., assignors to Pan American Petroleum Corporation, Tulsa, Okla., a corporation of Delaware
Filed Apr. 25, 1960, Ser. No. 24,355
2 Claims. (Cl. 181—.5)

This invention relates to seismic geophysical surveying and is directed particularly to the cancelling of secondary seismic reflections. More specifically, the invention is directed to an improved method and apparatus for substantially completely removing shotpoint secondary or multiple reflections from seismic field records to be displayed.

Seismic geophysical surveying as most commonly performed involves creating seismic waves by detonating an explosive in a shot hole in the earth below the low-velocity weathered layer and receiving the resultant seismic waves at the ground surface some horizontal distance away from the shotpoint. From the record of wave arrivals recorded as a function of time following the shot detonation, assuming the average subsurface velocity is known, the depth to any subsurface reflecting interface can be calculated from the arrival time of the corresponding wave front, assuming that the wave travel is directly downward from the shot and directly upward to the ground surface from the reflecting interface.

Unfortunately, however, any assumption that all reflected-wave arrivals involve only one reflection is contrary to fact. Because the disturbance created by the shot detonation travels not only downwardly but generally radially in all directions from the shot, a certain amount of this energy travels upwardly and frequently encounters a strongly down-reflecting interface, from which a secondary impulse travels downwardly following the original seismic impulse by only a short interval of time. Accordingly, when these two impulses, stretched out in time by travel through the earth, are reflected and subsequently arrive in close succession at the reception point, they often overlap or mutually interfere so as to make their separate identification difficult or virtually impossible. Even if they do not overlap and can be separately identified, the later arrival may be mistaken for or may interfere with a primary reflection from a deeper interface.

Since only the first of the two arrivals is useful in determining the interface depth of interest, the second arrival constitutes one form of seismic "noise." As each primary reflection is accompanied by a secondary reflection following it, when secondaries are observed, the number of reflections on a record is thereby automatically doubled without conveying any added information of interest. Accordingly, therefore, secondary reflections, sometimes also called "ghost" reflections, constitute undesirable waves that can very advantageously be eliminated.

Various attempts have been made to reduce or eliminate secondaries with varying degrees of success. Elongated continuous explosive charges, or arrays of spaced explosive charges, so detonated as to match seismic and detonation velocities along the charge or array length substantially improve the ratio of downwardly to upwardly radiated energy. However, not all of the upward energy is eliminated. Shooting at several different depths in a shot hole changes the relative arrival times of the primary and secondary reflections, so that they can sometimes be separately identified on traces displayed side by side from different shot depths. Also, combining two records from different depths in a shot hole can sometimes bring about partial cancellation of secondaries and reinforcement of primary reflections, if the depths are properly chosen. Further, two or more charges of proper relative size may be detonated in such a time sequence that the primary reflections of the later charges tend to cancel the secondaries of the earlier ones without themselves contributing additional secondaries of similar magnitude.

An additional method of secondary elimination involves recognizing that each secondary reflection bears a definite time, phase, and amplitude relation to the corresponding primary reflection, so that a feedback circuit can be arranged to take each primary arrival of energy, delay it, and feed it back in just the right phase and amplitude to cancel the secondary energy arrival when it subsequently appears.

In all of these methods of secondary reduction or elimination however, either the elimination is incomplete, or it requires determining the relative amplitude and delay time between the primary and secondary arrivals with considerable accuracy. On this latter point, the determination of the delay time is particularly important, as the cancellation is relatively ineffectual if the delay time is incorrect by only a small fraction of the apparent wave period. Frequently, it is not possible to employ records previously obtained in field shooting, as special field procedures or shooting techniques may be required in combatting secondaries.

In view of the foregoing, it is a primary object of our invention to provide a novel and improved method and apparatus for substantially completely eliminating all forms of shotpoint secondary energy from seismic records. It is a further object of our invention to provide a novel and improved secondary wave-arrival elimination method and apparatus which does not require special field techniques, knowledge of the magnitude or delay time of the secondaries involved, special explosive arrays, or expensive reproducing equipment. Still another object is to provide a method and apparatus for discriminating against and substantially eliminating any shotpoint secondary-reflection energy that may occur on seismic records without need for determining whether or not such energy is, in fact, present.

A still further object of our invention is to provide a method and apparatus for secondary seismic reflection removal from records which have been previously obtained, provided only that they are in phonographically reproducible form and have been obtained by shooting at two different depths in a given shot hole. Still another and further object is to provide a method of seismic secondary wave removal from seismic display records which is automatic in operation without regard to the amplitude, phase, and time delay of the secondary or secondaries, provided only that the same down-reflecting interfaces are in operation for the two or more depths of shooting in a shot hole. Other and further objects, uses, and advantages of the invention will become apparent as the description proceeds.

Briefly stated, the foregoing and other objects are accomplished in accordance with our invention by conventionally shooting at two or more different depths below the weathering interface in a shot hole and recording in a reproducible manner the resultant seismic waves at the usual spread seismometers. Recordings are preferably also made on an up-hole seismometer of the wave travel times from the various shots to the ground surface at the mouth of the shot hole; or in some other way measurements are made of the sub-weathering seismic velocities or wave-travel times between the various shot depths.

Subsequently, the reproducible records so obtained are reproduced so that the change in up-hole time between two or more recordings can be ascertained. Corrections for elevation, normal moveout, and variations in weathering travel time may also be introduced, but it is not necessary that this be done at this time. Corresponding traces of the different records are then subtractively combined, after delaying the shallower-record trace by an amount equal to the difference or change in up-hole time between the records being compared. This delay or time shift which may be introduced simply by a relative displacement of the playback heads for the corresponding traces of the different records, automatically brings into time alignment all of the secondary reflections present in the traces due to down-reflection of the energy at the shotpoint regardless of where the down-reflection occurred. Accordingly, when the reproduced traces are subtracted from each other, assuming that the secondaries are of about equal amplitude for the two or more shots, which can be arranged by proper relative amplitude adjustment in the reproducing process or by shooting with equal-weight charges in similar subsurface strata, the result is obtained that the equal secondaries of similar phase cancel each other. The primary reflections, however, not being in phase but rather being further separated in time by the time delay introduced, do not similarly cancel but only partially overlap. Due to the subtraction, they are of opposite phase; but they are presumably of known or about equal amplitude, insofar as the secondaries were also of equal amplitude.

The effect of this overlapping and resultant distortion of the primary reflection wave forms by each other is then eliminated by introducing the combined wave train into an addition circuit where the wave form is combined with itself after a delay time which is equal to twice the change in up-hole time. This is exactly the time separation between the primary reflection waves from any two shots in the subtraction trace, so that feeding back the arrival of a given reflection with the proper amplitude and this time delay exactly cancels its second appearance with opposite phase in the overlapping pattern. The resultant wave form is therefore the earlier-arriving primary reflection by itself, without any interfering wave form.

This will be better understood by reference to the accompanying drawings forming a part of this application and illustrating certain typical embodiments of the invention. In these drawings, FIGURE 1 is a simplified diagrammatic illustration of a cross section of the earth with seismic surveying apparatus in use, showing certain typical direct and secondary-reflection wave paths;

Figure 1:
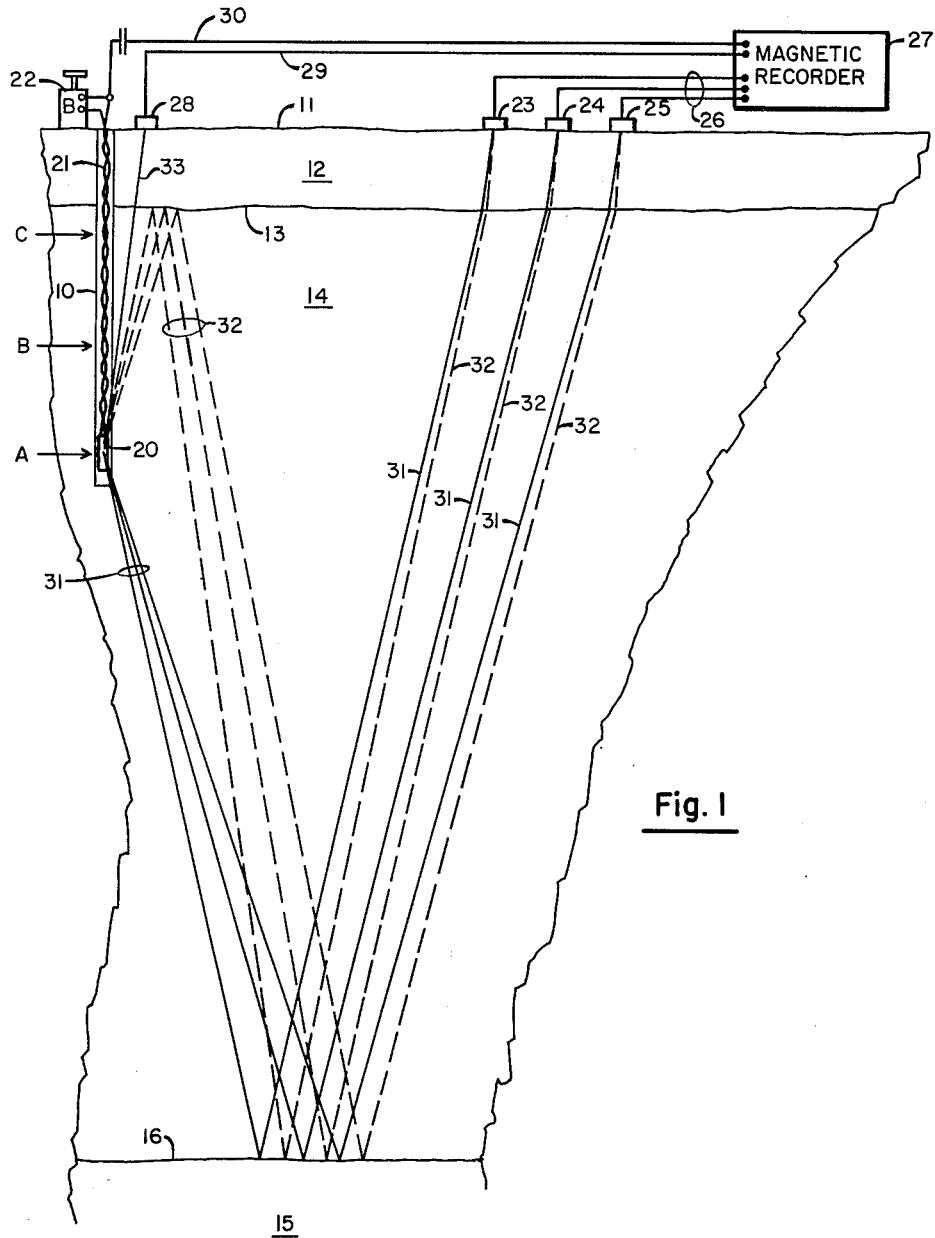

Referring now to these drawings and particularly to FIGURE 1 thereof, in this figure is shown diagrammatically a cross section of the earth, with apparatus for seismic surveying at the illustrated location. Thus, a shothole 10 extends from the earth's surface 11 to some distance below the weathered layer 12, which has a boundary 13 between it and the sub-weathering stratum 14, which is for illustrative purposes assumed to be homogeneous. At some distance below the bottom of shothole 10 is a boundary 16 between the subweathering layer 14 and a deeper layer 15 of different seismic-wave-transmitting properties, such that the boundary 16 forms a wave-reflecting surface. For performing a seismic geophysical survey, an explosive charge 20 is located at a depth A in the bore hole 10 and connected by firing leads 21 to a blaster 22 at the ground surface 11. Ordinarily, on surface 11 spaced at some distance horizontally from the mouth of shothole 10 is placed a seismometer spread consisting of seismometers 23, 24, and 25 connected by insulated leads in a cable 26 to a magnetic tape recorder 27. The showing of only three seismometers individually connected to the recorder 27 is purely symbolic, as conventional geophysical operations normally employ much larger numbers of seismometers and recorded traces.

At the ground surface 11 near the top of shothole 10 is normally placed a shothole or up-hole seismometer 28 connected by a lead 29 to recorder 27. Also a lead 30 extends from the circuit of blaster 22 to the recorder 27 for transmitting a time break indicating the instant of detonation of the charge 20. Although the various leads are shown as only single conductors, it is of course understood that they normally comprise pairs of conductors in practice.

As is well known, upon the detonation of explosive charge 20 by blaster 22, seismic waves are sent out radially in all directions from the charge location. These waves primarily of interest for determining the depth of the interface 16 are shown in solid lines as following the ray paths 31. As seismic-wave energy leaves the charge 20 in many other directions besides those of the rays 31, however, it frequently occurs that an appreciable portions follows the dashed-line paths 32 upward toward the ground surface 11 until the base of the weathering layer 12 is encountered at interface 13, where an appreciable down-reflection of the upwardly traveling energy may occur. Accordingly, this energy continues along the dashed-line paths 32 to the reflection 16 and is returned thence to the ground surface and seismometers 23, 24, and 25, a short time after the arrival of the direct-reflection energy along the ray paths 31. Although in the drawing it is shown that the major down-reflection of energy occurs at boundary 13, it is also frequently true that an appreciable amount of energy passes through this boundary to the ground surface 11 and is reflected therefrom, as well as from any intermediate interfaces that may exist within the layer 12.

Among the other waves traveling away from the shot 20, there is an important direct wave traveling along the path 33 to the seismometer 28 at the mouth of shothole 10, which shows the time of travel over the most direct path between the shot 20 and the ground surface 11.

As it is a basic requirement of our procedure that there be available at least two records made by shooting at different depths at the bore hole 10, the record made by shooting at the depth A is supplemented by at least one other record shot at a depth B. Preferably also a third record is made by a shot at a depth C, all of these shot depths being below the down-reflecting interface 13 and the surface 11 and any other interfaces above the shots which produce pronounced down-reflection of energy.

Figure 2:
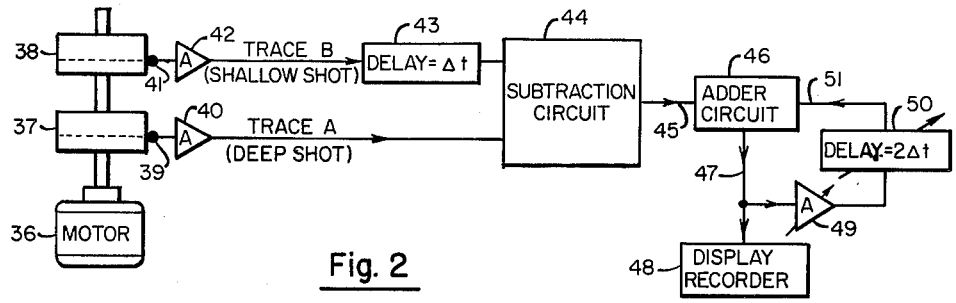
FIGURE 2 is a block diagrammatic illustration of a simplified version of the apparatus of the invention.

Referring now to FIGURE 2, this figure shows in block diagrammatic form a simplified apparatus embodiment of our invention. Before undertaking to utilize the apparatus of FIGURE 2, it is necessary to have measured the up-hole travel times over the path 33 from the respective depth positions A and B in such a way as to determine the difference between these times due to the difference in length of the path from the two positions. Let this time difference be designated as $\Delta t$ milliseconds. While the use of up-hole times to determine $\Delta t$ is here shown as a preferred procedure, as up-hole times are conventionally recorded for other purposes, such as making weathering corrections, it is also possible to determine $\Delta t$ directly, simply by measuring the travel time of seismic waves from A to B and from A to C by the use of a seismic wave source and one or more detectors spaced therefrom in the hole.

In FIGURE 2 is shown in rudimentary form a playback apparatus consisting of a constant-speed motor 36 suitably driving a pair of playback drums 37 and 38. The playback drum 37 carries the record made by the field magnetic tape recorder 27 with shot 20 at depth A while drum 38 similarly carries the record made with shot 20 at depth B. While these playback drums are being rotated by motor 36, the playback head 39 and amplifier 40 electrically reproduce one of the recorded traces, for example, that made of the output of the seismometer 23. Simultaneously the playback head 41 and amplifier 42 similarly electrically reproduce the corresponding trace of seismometer 23 made while shooting at depth B. For simplicity, these respective traces are simply referred to as trace A and trace B.

With the drums 37 and 38 in time alignment, that is, with the respective time breaks of the two records coinciding, both traces are fed to a subtraction circuit 44, after trace B, made at the shallower shot depth, has been passed through a time delay 43 producing a relative delay or time shift with respect to trace A equal to the change in up-hole time $\Delta t$. A simple and desirable alternative to utilizing the delay element 43 is to relatively reposition drums 37 and 38 with respect to each other so that the time break for trace B occurs $\Delta t$ milliseconds after that for trace A. Obviously, this relative time shift can be accomplished either by advancing the drum 37 or retarding the drum 38, or by correspondingly shifting one of the playback heads 39 and 41 in the lengthwise direction of the traces.

The output of subtraction circuit 44, which is the difference or remainder electrical wave train between traces A and B electrically combined, is applied to one input lead 45 of an addition circuit 46. Adder circuit 46 has an output lead 47 extending to a display recorder 48 and also to an amplifier 49 of adjustable gain. The output of amplifier 49 is passed through a delay element 50 and then applied to the other input lead 51 of the addition circuit 46. Accordingly, the output of the circuit 46 on lead 47 is the summation of the inputs on leads 45 and 51. The delay of element 50 is set to exactly $2\Delta t$ milliseconds, and the gain of the amplifier 49 is preferably so adjusted as to produce unity gain on the feedback loop from output 47 to input 51.

Figure 3:
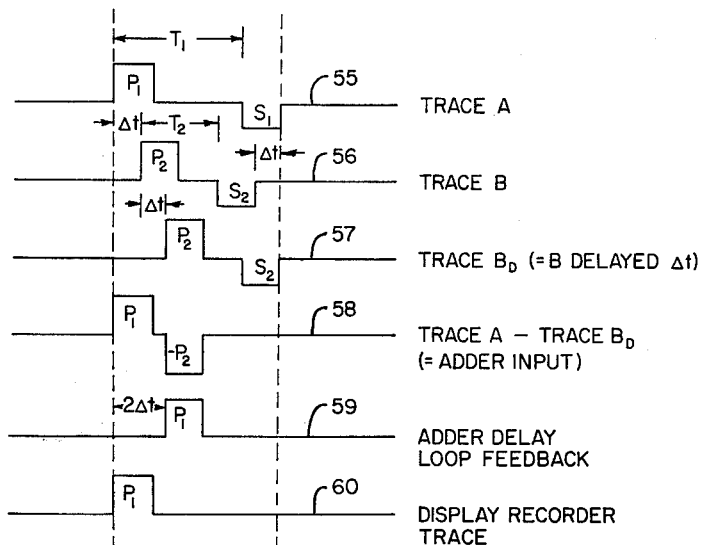
FIGURE 3 shows graphically the wave forms present at various places in the apparatus of FIGURE 2.

The operation of the apparatus of FIGURE 2 and the basic principles of our invention will now be explained with reference to FIGURE 3. In this figure, trace 55 corresponds to trace A, showing as impulse $P_1$ the primary reflection traveling over wave path 31 to and from the reflector 16 and as impulse $S_1$ the secondary reflection traveling over the dashed-line path 32. There is a time interval $T_1$ between the onset of primary $P_1$ and secondary $S_1$ due to the somewhat greater length of the path traveled by $S_1$. For ease in understanding, these waves are shown as simple, block-wave forms rather than the complex wavelets actually recorded, since the principles of the invention are independent of the form of the waves involved.

Trace 56 corresponds to trace B made by shooting at depth B shallower than A, on which trace the primary reflection arrival is the block wave $P_2$ and the secondary is $S_2$. Due to the somewhat longer path of the primary rays 31 from position B as compared with A, $P_2$ arrives at a time $\Delta t$ later than $P_1$ of trace A, while the secondary $S_2$ arrives by almost exactly this same time interval $\Delta t$ earlier than the secondary $S_1$ due to the shorter path for $S_2$. The difference $T_2$ in the arrival times of the primary and secondary $P_2$ and $S_2$ is less than $T_1$ by exactly $2\Delta t$. This $\Delta t$, which describes the change in primary and secondary reflection times, is the same $\Delta t$ measured by seismometer 28 as the change in up-hole time.

Trace 57 shows the effect of delaying the trace B a time interval $\Delta t$ relative to trace A. As will be apparent, this time delay places secondaries $S_1$ and $S_2$ in time coincidence, while it increases the difference in arrival times of the primaries $P_1$ and $P_2$ from $\Delta t$ to $2\Delta t$. Now, assuming that the secondaries are of equal amplitude, as will be frequently true if the same size of explosive charge is used at depths A and B and the formation is relatively homogeneous, or as can be arranged by proper relative amplitude adjustments, subtracting trace 57 from trace 55 brings about mutual cancellation of secondaries $S_1$ and $S_2$. Trace 58 shows the effect of operation of subtraction circuit 44, in that the secondaries have been removed by cancellation and what remains is the difference in primaries $P_1$ and $P_2$, which now forms the input transmitted over the lead 45 to adder circuit 46.

On the assumption that primaries $P_1$ and $P_2$ are of about the same amplitude and wave form, which is reasonable in view of the fact that shooting at depths A and B is done as nearly alike as possible, it is apparent that $P_2$ on trace 58 is the same as $P_1$ except that it is inverted and delayed by the time interval $2\Delta t$. Therefore, by feeding back into the addition circuit 46 on input lead 51, the adder output wave form on lead 47 after a delay of $2\Delta t$ by the delay element 50, the signal fed back is shown as trace 59 which corresponds to $P_2$ in trace 57. When fed back with exactly this amplitude and delay, it accordingly exactly cancels the inverted wave form of $P_2$ on trace 58 when it subsequently enters the addition circuit 46 over the lead 45. The result of this operation is the trace 60 on which the primary $P_1$ from the deep shot at depth A appears alone without any overlapping by the primary $P_2$ or distortion by secondaries $S_1$ or $S_2$.

If it is desirable to recover $P_2$ alone or in addition to $P_1$, this can be done by separately recording the signal present on feedback lead 51. It should be noted, however, that the indicated record times of the recorded events will be $\Delta t$ milliseconds late due to the action of delay 43.

A number of significant characteristics and advantages of this invention will now be apparent. The magnitudes of separation $T_1$ and $T_2$ between the respective primaries and secondaries are immaterial and do not have to be determined. Neither does the amplitude ratio between each primary and its secondary enter into the process. If the secondary is not a simple wavelet, but is the superposition pattern of several wavelets, such as reflections from both the base of the weathering and the ground surface, complete cancellation still occurs in the subtraction process as long as the amplitudes are the same. The only assumptions involved are that the primaries shot at the two depths are substantially alike in amplitude and form, as are the secondaries. Whether each primary and its secondary are alike or quite different in form does not matter.

It is not even necessary to know whether there is shot-point secondary energy present or not. If there is none, then no cancellation occurs in the subtraction, and the original primaries are recovered in the final adding circuit just the same as when secondaries are present and have been cancelled.

The magnitude of the up-hole time is likewise not material. The single quantity which is important is $\Delta t$, the seismic-wave travel time from A to B, which is equal to the difference in up-hole times for the two shot depths. Even if the assumed equal amplitudes are not exactly equal, but differ by say 10 percent, the secondary cancellation is 90 percent effective, and only 10 percent of the overlapping primary will remain on the final record.

While the circuit of FIGURE 2 illustrates the principles of our invention, it is subject to the practical difficulty that instability with a tendency toward oscillation may arise from the positive-feedback, unity-gain loop in the adder circuit. This problem is avoided by the modification shown in FIGURE 4, where the cancellation of $P_2$ in the remainder trace is performed in two steps in sequence. Thus, the remainder trace on lead 45 is applied to one input terminal of a first adder $46a$. The output $47a$ of this adder is amplified by an amplifier $49a$, delayed $2\Delta t$ milliseconds by delay $50a$ and fed back with positive phase to the other input $51a$ of adder $46a$.

Through a buffer amplifier 52, output $47a$ is applied to one input of a second adder $46b$ whose output $47b$ is amplified by an amplifier $49b$, delayed $2\Delta t$ milliseconds by delay $50b$ and applied with positive phase to the other input 51b. The output 47b is also connected to the final display recorder 48.

The sum of the gains of amplifiers 49a and 49b is adjusted to be substantially equal to unity. Preferably, the gain of the first amplifier 49a is made as near to unity as possible without becoming unstable, and the balance of the unity gain is provided by the amplifier 49b. This results in complete cancellation of $P_2$, but adds a later low-level reverberation due to the uncancelled residue of $P_2$, which tends to circulate around the feedback loop of the first adder. As each of the two adder circuits is itself stable, however, and isolated from the other by amplifier 52, the overall system is stable.

Figure 5:
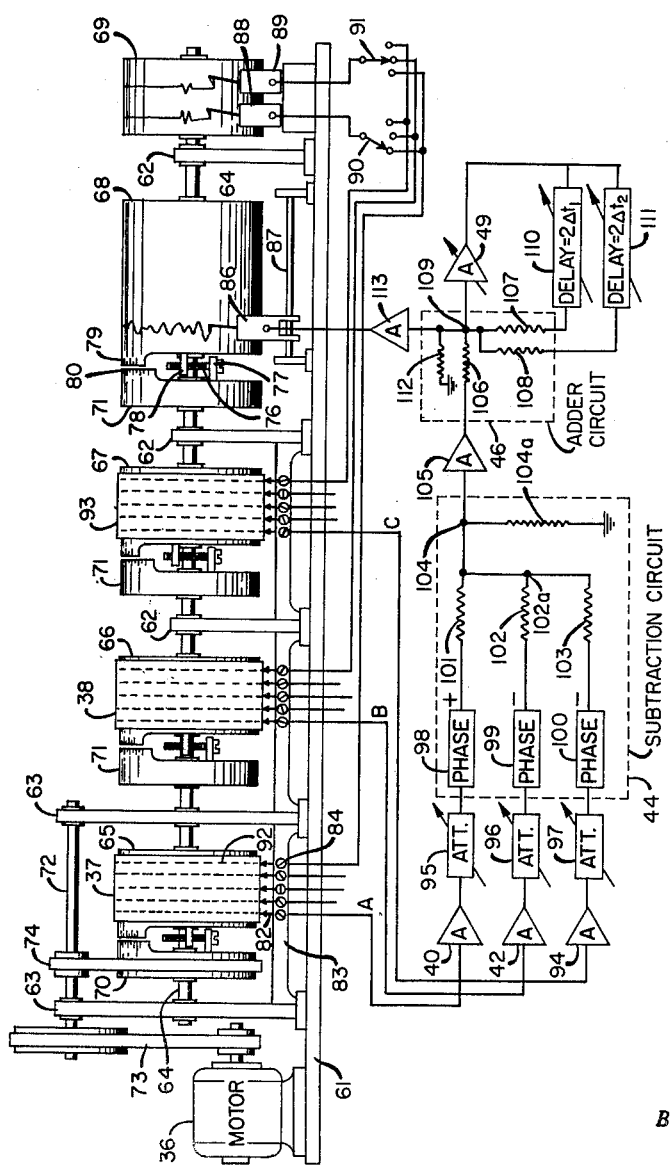
FIGURE 5 is a schematic diagram in additional detail of an alternative embodiment of the invention.

Referring now to FIGURE 5, this figure shows diagrammatically in greater detail than FIGURE 2 a preferred embodiment of our invention. The mechanical portion of the apparatus of FIGURE 5 comprises a base 61 on which are mounted a number of spaced bearing-supporting members 62 and 63, which support an elongated rotatable shaft 64. Rotatably mounted on the shaft 64 are a plurality of playback drums 65, 66, and 67 adapted to hold the field magnetic recordings produced by the recorder 27 of FIGURE 1. Also on the shaft 64 is a display drum 68 and a synchronizing drum 69. All of the drums except 69 are rotatable on shaft 64 but are adjustably fixed with respect to the shaft by the driving members 70 and 71 which are rigidly attached to the shaft. Besides supporting the shaft 64, the two spaced supporting members 63 also rotatably support a countershaft 72 carrying a pair of speed-reducing pulleys driven by the constant-speed motor 36 mounted on base 61 and driving the shaft 64 at a slow constant speed. As is well known, the cogged V-belts 73 and 74 respectively transmitting rotation to shaft 72 and thence to shaft 64 provide a smoothly operating mechanical connection which is free of slippage. The V-belt 74 positively engages the driving member 70 associated with the playback drum 65 and through member 70 turns the shaft 64.

The mechanical connection between each driving member 70 or 71 fixed to the shaft 64 and its associated drum preferably comprises an adjusting screw 76 extending between projections 77 and 78 respectively attached to and extending outwardly into the space between each driving member 70 or 71 and its associated drum, such as drum 68. Relative rotation of the drum with respect to its driving member is then accomplished by rotation of the screw 76, while observing a time scale 79 carried by the drum adjacent a vernier scale 80 carried by the driving member. With this arrangement any desired relative orientation of the various drums 65, 66, 67, and 68, can be obtained by appropriate adjustment of different ones of the adjusting screws 76, using corresponding scales 79 and 80. Each scale 79 is preferably calibrated in milliseconds of recording time.

Contacting the record held on each corresponding one of playback drums 65, 66, and 67 is a group of magnetic playback heads 82 mounted on a supporting member 83. Preferably, each of the heads 82 is shiftable tangentially along the record surface by means of one of the adjusting screws 84 carried by the support 83, so as to compensate for time differences between adjacent seismometer traces caused by weathering and elevation variations and the like.

Supported adjacent the display drum 68 is a pen-writing recorder 86, slidably mounted on a horizontal bar 87 carried between a pair of supports mounted on the base 61. Thus, the pen writer 86 is in a position to record on the drum 68 a trace resulting from the playback of records on playback drums 65, 66, and 67 while all of the drums are being rotated simultaneously. Successive traces are recorded side by side by shifting pen-writer 86 to successive positions along bar 87.

Adjacent the synchronizing drum 69 is a pair of similar pen-writing recorders 88 and 89 likewise positioned to record on the drum 69 electrical signals applied thereto.

The pen writers 88 and 89 are respectively electrically connected to the movable contactors of a pair of selector switches 90 and 91 having fixed contacts electrically connected to the playback heads adapted to play back the timebreak trace 92 of each of the records on the playback drums 65, 66, and 67. In addition to the records 37 and 38 on playback drums 65 and 66, corresponding to shooting at depths A and B in FIGURE 1, the playback drum 67 carries an additional record 93 made by shooting at depth C in FIGURE 1.

The other electrical portions of the embodiment of FIGURE 5 include, besides the playback amplifiers 40 and 42 reproducing respectively traces A and B from records 37 and 38, an additional playback amplifier 94 reproducing the corresponding trace C from record 93. The outputs of the amplifiers 40, 42 and 94 are respectively applied to adjustable attenuators 95, 96, and 97 and thence to the subtraction circuit 44, which is here shown in detail to consist of phase-adjusting devices 98, 99, 100 and adding resistors 101, 102, and 103. As is well known, the current flowing in each of these resistors is proportional in magnitude and of the same polarity as the voltage applied from each corresponding attenuator. The resistors 101, 102, and 103 are electrically tied together to a junction point 104 which is connected to electrical ground through a resistor 104a. The currents flowing in the resistors 101, 102, and 103 are thereby algebraically added, so that their voltage drop across resistor 104a is proportional to the summation. The voltage appearing at point 104 is transmitted through an amplifier 105 to the adder circuit 46, which is here shown in detail to consist of the isolating, adding resistors 106, 107, and 108, connected to the common junction point 109.

In this embodiment, the amplifier 49 in the adder feedback loop feeds the delay elements 110 and 111 respectively adjusted to produce delays of $2\Delta t_1$ and $2\Delta t_2$ and respectively connected through the adding resistors 107 and 108 to the junction point 109. The electrical currents flowing through resistors 106, 107, and 108 add together at the junction point and produce a voltage drop proportional to their sum across a resistor 112 connected from the junction point 109 to electrical ground. This voltage is amplified by an amplifier 113 and fed to the display pen recorder 86.

The operation of the embodiment of the invention in FIGURE 5 will now be explained by reference to the graphical wave forms shown in FIGURE 6. In this figure traces A, B, and C designated by numerals 115, 118, and 121 are traces recorded by a given seismometer or seismometer group from shots fired at the three different depths, A, B, and C, shown in FIGURE 1. The wave forms of the waves assumed for purpose of illustration to combine to produce traces A, B, and C are shown separately on the right. Thus, the primary $P_1$ and the secondary $S_1$ which occur with the time spacing $T_1$ from shot depth A are respectively shown as the traces 116 and 117 and combine in the recording to produce the trace 115. Likewise, the primary and secondary $P_2$ and $S_2$ shown by traces 119 and 120, respectively, correspond to shooting at depth B in well 10, and these combine with a time difference of $T_2$ to produce trace 118. Likewise, traces 122 and 123 showing primary $P_3$ and secondary $S_3$ correspond to shooting at depth C and combine to produce trace 121.

Although the wave forms shown are highly idealized in that they are block waves rather than sine-wave types, nevertheless, they illustrate the invention adequately because no assumption is required to be made regarding the form of the various waves. While the secondary waves are shown as similar to form to the primary wave and of opposite phase, it is not necessary that this be true.

The wide variations in "character" of the traces A, B, and C, due solely to varying the time interval between identical primary and secondary wavelets, show, incidentally, how much confusion unrecognized secondaries can create for an interpreter trying to pick and correlate the primaries alone.

Both from the up-hole travel times as measured by seismometer 23 and from the arrival times of the primary reflections $P_1$, $P_2$ and $P_3$, it can be seen that shooting at the depth B produces a delay of $\Delta t_1$ in the arrival of $P_2$ as compared to $P_1$, and in the case of $P_3$ with a delay of $\Delta t_2$ as compared with $P_1$. As was true in connection with the explanation of FIGURE 3, the secondaries $S_1$, $S_2$ and $S_3$ are similarly related in their relative arrival times, in the $S_2$ arirvCes $\Delta t_1$ earlier than $S_1$, and $S_3$ arrives $\Delta t_2$ earlier than $S_1$.

Figure 6:
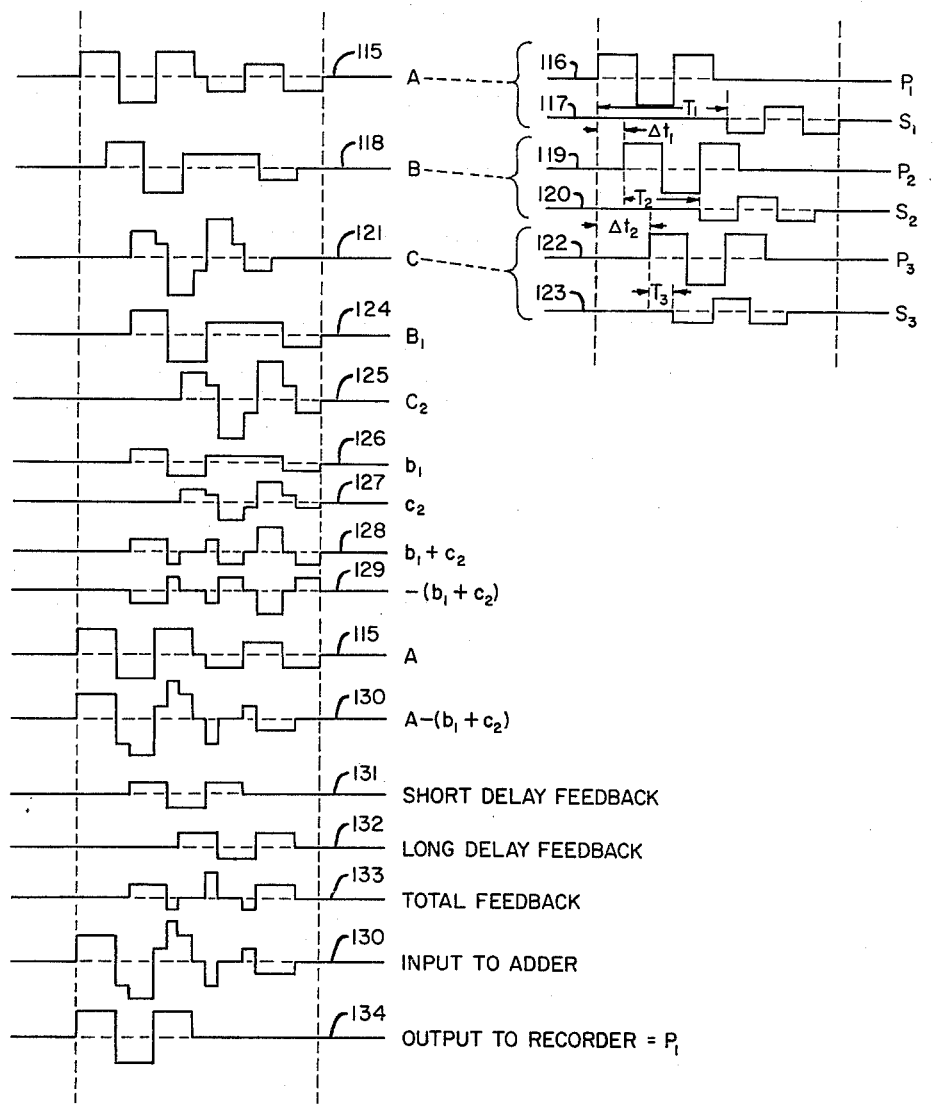
FIGURE 6 shows typical wave forms present at various places in the apparatus of FIGURE 5.

Traces 124 and 125 of FIGURE 6 correspond to adjustment of the relative positions of drums 66 and 67 with respect to drum 65 by means of the respective adjusting screws 76 whereby the trace 118 is given an additional time delay $\Delta t_1$ and the trace 121 is given an additional greater time delay $\Delta t_2$. As will be apparent from what has been said above, this brings the secondary waves $S_2$ and $S_3$ into time coincidence with $S_1$.

Traces 126 and 127 are reproductions of traces 124 and 125 respectively, except that they show the effect of adjusting each of the attenuators 96 and 97 to produce an output amplitude equal to one-half that of the attenuator 95.

Trace 128 represents the summation of traces 126 and 127 and with respect to FIGURE 5 represents the sum of the currents flowing through resistors 102 and 103 to the junction point 102a, except for the effect of phase-adjusting devices 98, 99 and 100. These devices may constitute simple polarity-reversing switches. As shown by the adjacent algebraic signs, the phase adjuster 98 is maintained positive so that the wave form of traces B and C, reduced in amplitude by attenuators 96 and 97, are now of opposite phase to trace A. Accordingly, trace 129 of FIGURE 6 shows the effect of this phase reversal introduced by elements 99 and 100.

The trace 130 of FIGURE 6 represents the summation of traces 115 and 129. This is in effect a subtraction due to the previous reversal of phases in trace 129; however, it is performed electrically as an addition through the isolating and addition-forming resistors 101, 102 and 103. Thus, the sum of the electric currents transmitted by these resistors to the common junction point 104 and flowing from there through the resistor 104a to electrical ground is the quantity represented by trace 130. The resultant voltage at 104, amplified by the amplifier 105, is then transmitted to the adding circuit 46. This trace 130 contains only primary energy at this point because of the fact that the secondary energy has been canceled out in the subtraction step. Because of overlap, however, the primary reflections may not be individually recognizable.

Assuming that, in common with the secondaries, the primary reflections were reduced to one-half amplitude in going from traces 124 and 125 to traces 126 and 127, respectively, the gain of amplifier 49 in the adding circuit feedback loop is adjusted to produce an effective gain of one-half around the loop. Accordingly, as the wave form shown by trace 130 enters the addition circuit, it produces a current at junction point 109 through the resistor 106 proportional to its voltage variations. This voltage at point 109 is amplified by amplifier 49 and fed through the delay 110 to the resistor 107 with a delay of $2\Delta t_1$. The current entering the junction point 109 through resistor 107 accordingly is that corresponding to trace 131 of FIGURE 6. Similarly the current through delay 111 delayed by the time $2\Delta t_2$ and flowing through the resistor 108 to junction point 109 is that shown on trace 132. The total current fed through these two resistors to point 109 is shown as trace 133 which, as it combines with the input-trace current entering the addition circuit through resistor 106, produces a resultant current flow through the resistor 112 to ground of the form of trace 134. It is the voltage drop across this resistor 112 which is amplified by amplifier 113 and applied to pen-recorder 86. As will be apparent from FIGURE 6, trace 134 corresponds exactly to the wave form of primary reflection $P_1$ due to the deep shot fired at depth A in the well of FIGURE 1.

Figure 4:
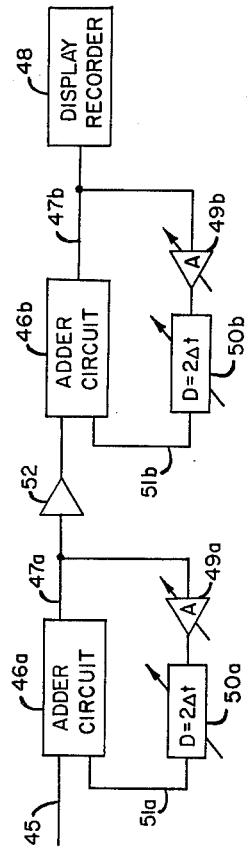
FIGURE 4 is a block wiring diagram of a modification of part of the apparatus of FIGURE 2.

As was true of the modification shown in FIGURE 4, the use of gains less than unity in the adder feedback loops of FIGURE 5 similarly avoids possible circuit instability. The embodiment of FIGURE 5 has the further advantage over FIGURE 4 that no spurious signals are introduced because of feeding back residual uncancelled signals.

In the general case of $n+1$ traces from $n+1$ shots at different times and depths in a hole, part of the traces, preferably including that from the deepest shot, can be combined into a minuend wave, and the rest of the $n$ shallower-shot traces can be combined into a subtrahend wave with improvement in signal-to-noise ratio for both waves. As before, each of the $n$ shallower-shot traces is delayed by the appropriate $\Delta t_n$ to place all the secondaries in time coincidence. The required amplitude adjustments are such as to make the sum of the amplitudes in the minuend wave equal to the sum of the amplitudes in the subtrahend wave. Upon making the subtraction, the secondaries then cancel.

The primary restoration circuit must have $n$ feedback loops, each with a gain corresponding to the amplitude of a particular one of the $n$ shallower-shot traces in the minuend or subtrahend waves, and with a corresponding delay of $2\Delta t_n$. The polarity of the feedback will depend on whether the particular shallower-shot trace was in the minuend or the subtrahend wave, being respectively negative and positive for the two cases. In this way the principle of noise reduction by addition (and subtraction) of a number of traces can be included in the secondary elimination process where a number of records are available to be combined.

Figure 7:
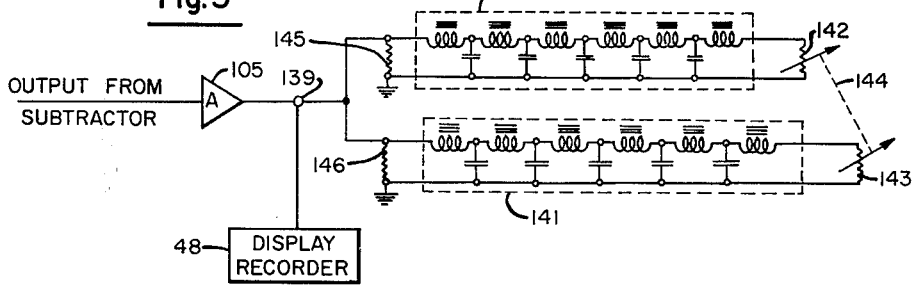
FIGURE 7 is a wiring diagram partially in block form of a primary reflection-restoring system alternative to that shown in FIGURE 5.

In FIGURE 7 is shown a further modification of the addition circuit 46 and its associated delay and feedback loops. In this embodiment the voltage output of the amplifier 105 is fed to the junction point 139 to which is connected the recorder 48, which may take the form of the pen writer 86 and the drum 68. Also connected to the junction point 139 are a pair of artificial transmission lines 140 and 141 each composed of a number of series inductances and shunt capacitances. As is well known, by choosing the inductances and capacitances of sufficiently small value and using a sufficiently large number of them, any necessary amount of delay can be provided over a range of frequencies including all of the frequencies of interest with small attenuation. It is only necessary to add a sufficient number of sections to each line to achieve the desired delay. At the ends of lines 140 and 141 respectively opposite from the junction point 139 the lines are terminated by the adjustable impedances 142 and 143. By adjusting the values of impedances 142 and 143 to proper values, which may be similar values as indicated by the mechanical interconnection 144, a reflection of the wave trains arriving at the ends of the transmission lines of appropriate phase and amplitude is provided. Such attenuation as occurs in the lines can readily be allowed for in making this terminal impedance adjustment. As the lines 140 and 141 are terminated at their input ends in the impedances 145 and 146 which respectively match the characteristic impedance of these transmission lines, no reflection occurs when the waves which have been returned from the remote ends of the transmission lines arrive there. Accordingly, there is no likelihood of reverberation and thus oscillation of the applied wave forms within either the transmission line 140 or 141.

Since the delay provided occurs in two passes through each of these artificial lines, in order that line 140 approximate the delay $2\Delta t_1$, it is necessary only that the delay on passage in one direction be equal to $\Delta t_1$. Similarly, the delay on passage in one direction through the line 141 should be equal $\Delta t_2$. As the resultant wave form at junction point 139 is at any instant the algebraic summation of the input wave form arriving from amplifier 105 and the reflected wave forms provided by lines 140 and 141, it is believed clear that the resultant voltage at point 139 recorded by recorder 48 is that corresponding to trace 134 of FIGURE 6, which is the deepest-shot primary reflection free of overlap with any other primary reflections or secondaries.

While our invention has thus been described by reference to the foregoing embodiments and specific details, it is to be understood that its scope is not to be considered as limited to the details described, but is rather to be ascertained from the appended claims.

We claim:

1. In a method of substantially canceling shot-point secondary reflections from a seismic record trace which comprises the steps of creating seismic waves at at least two substantially different depths in a shot hole, reproducibly recording a plurality of seismic traces, each trace representing the resulting seismic waves received from one of said depths after travel through the earth to a receiver spaced from said shot hole, simultaneously reproducing said plurality of traces while time-delaying each shallower-depth trace relative to the greatest-depth trace by a time interval $\Delta t$ equal to the travel time of compressional seismic waves between said greatest depth and said shallower depth, to place any secondary reflections present in said traces in time coincidence, and subtracting at least one shallower-depth trace as a subtrahend trace from said greatest-depth trace as a minuend trace, with corresponding wave amplitudes in said traces adjusted to be substantially equal, to produce a remainder trace wherein said secondary reflections have substantially canceled themselves but primary reflections are self-distorted by being subtractively superimposed out of time coincidence in said subtracting step, the improvement wherein said primary reflections are recovered substantially free of said self-distortion which comprises the steps of progressively adding said remainder trace and a feedback trace to produce a summation trace, said feedback trace being a reproduction of said summation trace delayed a time interval $2\Delta t$ to place the primary reflections in said feed-back trace in time coincidence with their occurrences in said subtrahend trace which produced said distortion, whereby due to being of similar amplitude and opposite phase they cancel in said summation trace, and recording said summation trace as the primary-reflection record trace substantially free of both secondary reflections and primary-reflection distortion.

2. In a method of substantially canceling shot-point secondary reflections from a seismic record trace which comprises the steps of creating seismic waves at at least three substantially different depths in a bore hole, reproducibly recording at least three seismic traces, each trace representing the resulting seismic waves received from one of said depths after travel through the earth to a receiver spaced from said shot hole, simultaneously reproducing said three traces while time-delaying each shallower-depth trace relative to the greatest-depth trace by the time interval $\Delta t_1$ or $\Delta t_2$ equal to the travel time of compressional seismic waves between said greatest depth and each of the two shallower depths respectively, to place any secondary reflections present in said traces in time coincidence, and subtracting said shallower-depth traces from said greatest-depth trace, with the wave amplitudes in said traces being adjusted so that the subtractively combined secondary reflections are of substantially equal amplitude so as to substantially cancel themselves in a remainder trace, but primary reflections are self-distorted in said remainder trace by being subtractively superimposed out of time coincidence, the improvement wherein said primary reflections are recovered substantially free of said self-distortion, wherein said subtracting step comprises first adjusting the wave amplitudes of said shallower-depth traces to make the sum of said amplitudes substantially equal to the amplitude of said greater-depth trace, said improvement comprising the further steps of progressively adding said remainder trace and two feedback traces to produce a summation trace, said feedback traces being reproductions of said summation trace delayed by time intervals $2\Delta t_1$ and $2\Delta t_2$, respectively, and of amplitudes corresponding to the respective shallower-trace amplitudes summed to form the subtrahend trace of said subtracting step, so as to place the primary reflections in said two feed-back traces in time coincidence with their occurrences in said subtrahend trace which produced said distortion, whereby due to being of similar amplitude and opposite phase they cancel in said summation trace, and recording said summation trace as the primary-reflection record trace substantially free of both secondary reflections and of primary-reflection distortion.

References Cited by the Examiner

UNITED STATES PATENTS

| | | | |
|---|---|---|---|
| 1,959,004 | 4/34 | Owen | 181—.53 |
| 2,243,730 | 4/41 | Ellis | 181—.53 X |
| 2,684,468 | 7/54 | McClure et al. | 340—15.5 |
| 2,806,545 | 9/57 | Schempf | 181—.53 |
| 2,846,662 | 8/58 | Sparks | 340—15 |
| 2,876,428 | 3/59 | Skelton et al. | 181—.53 X |
| 2,902,107 | 9/59 | Erath et al. | 181—.53 |
| 2,928,071 | 3/60 | Feagin et al. | 340—15 |
| 2,956,261 | 10/60 | Grossling | 340—15.5 |
| 2,960,176 | 11/60 | Parrack | 181—.53 |
| 2,989,135 | 6/61 | Pierce et al. | 181—.53 |
| 3,012,625 | 12/61 | Piety | 181—.53 |
| 3,070,777 | 12/62 | Lindsey et al. | 340—15.5 |

SAMUEL FEINBERG, *Primary Examiner.*

CHARLES W. ROBINSON, J. SPENCER OVERHOLSER, CHESTER L. JUSTUS, *Examiners.*